Patented Sept. 1, 1925.

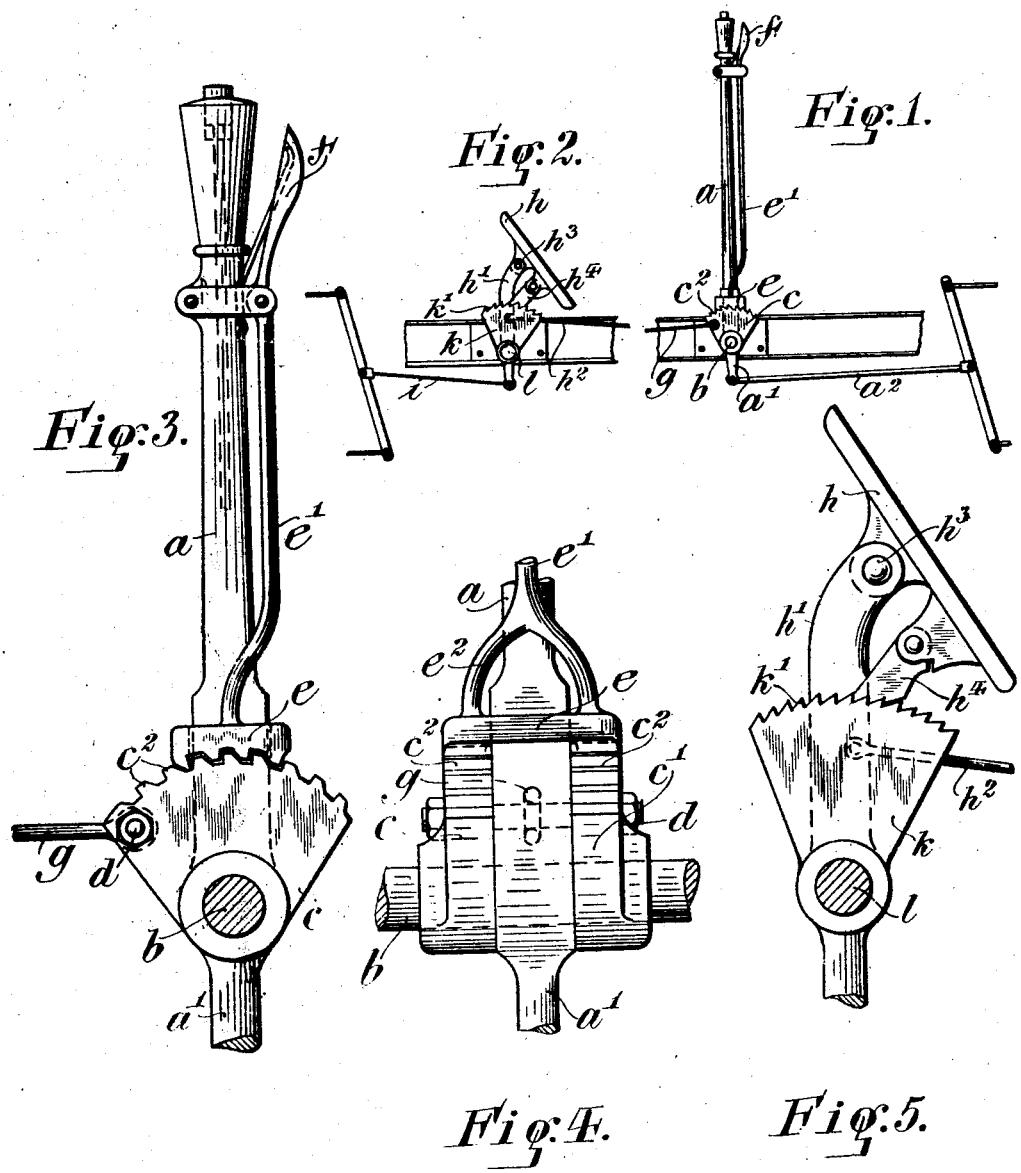

1,551,596

UNITED STATES PATENT OFFICE.

HENRY J. WHITE, OF LITTLE NECK, AND WILLIAM B. JUPP, OF NEW YORK, N. Y., ASSIGNORS TO INTERNATIONAL MOTOR COMPANY, OF NEW YORK, N. Y., A CORPORATION OF DELAWARE.

WHEEL BRAKE FOR VEHICLES.

Application filed February 23, 1924. Serial No. 694,515.

*To all whom it may concern:*

Be it known that we, HENRY J. WHITE and WILLIAM B. JUPP, citizens of the United States, residing, respectively, in Little Neck, Long Island, in the State of New York, and in the borough of Manhattan, of the city of New York, in the State of New York, have invented certain new and useful Improvements in Wheel Brakes for Vehicles, of which the following is a specification, reference being had to the accompanying drawing, forming a part hereof.

This invention relates to braking systems for vehicles in which brakes are applied to a plurality of pairs of wheels as is now being done, for instance, to four wheels of motor vehicles. Some objection has been raised to such braking systems by reason of a tendency to skid when all of the wheels are subject to braking pressure, under some peculiar circumstances. By the present invention it is proposed to permit the convenient and instant release of more or less braking effort from certain of the wheels when skidding is induced. In the preferred embodiment the releasing means are directly associated with the braking instrumentalities so that the operator may quickly and naturally perform the required manipulation in a somewhat mechanical way. In some cases, for instance, the releasing mechanism is associated with the foot brake by which the plurality of brakes are applied while in other instances the releasing devices are associated with the hand-lever by which the brakes are applied. In carrying out the invention in connection with four wheel brakes, for instance, it is proposed to connect the front and rear brakes to separate levers which may be operatively interconnected by a releasable pawl so that so long as the pawl is engaged the levers move simultaneously but when the pawl is disengaged one of the levers is released.

The invention will be described with reference to the preferred embodiments illustrated in the accompanying drawings, in which:

Figure 1 is a view in side elevation showing hand-operated instrumentalities for the application of four wheel brakes.

Figure 2 is a view in side elevation showing foot-operated instrumentalities for the application of four wheel brakes.

Figure 3 is a detailed view in side elevation showing the releasing mechanism as applied to the hand brake.

Figure 4 is a fragmentary view in end elevation of the mechanism shown in Figure 2.

Figure 5 is a fragmentary view in side elevation of the releasing mechanism applied to the foot pedal.

Referring now particularly to the application of the improvements of hand-operated mechanism for applying front and rear brakes in a four wheel braking system for motor vehicles, for instance, there is shown in Figs. 1 and 3 a conventional hand-lever $a$ adapted to oscillate on a supporting shaft $b$ and provided with a lower arm $a'$ in which is connected a pull rod $a^2$ by which braking effort is applied, through suitable equalizing devices if desired, to, say, the rear wheel brakes. On the same shaft $b$ may be mounted loosely one or more quadrants $c$, $c'$, shown as disposed at opposite sides of the hand-lever $a$ and connected rigidly by a bolt $d$. The quadrants $c$, $c'$, are formed with ratchet teeth $c^2$ for engagement by a pawl $e$ operable by a hand grip $f$ carried on the hand-lever $a$ in a manner which is now known and practiced in other uses. The pawl $e$ may embrace the hand-lever $a$ and the lower end of the release rod $e'$ may be bifurcated as at $e^2$ to insure positive operation of the pawl. The brake rod $g$ for, say, the front wheel brakes may be engaged with the quadrants $c$, $c'$, as by anchorage to the bolt $d$, or by any other suitable means.

Operation of the improved mechanism should be apparent from the foregoing description. So long as the pawl $e$ engages the ratchet teeth $c^2$ the quadrants $c$, $c'$, are, of course, connected fixedly with the hand-lever $a$ and partake of its movement either in applying the brakes simultaneously or in releasing them simultaneously. If now, it be assumed that the brakes are being applied and a tendency to skid is induced on the front wheels, their brakes may be instantly released without releasing the rear brakes by pressure on the hand grip $f$ by which the pawl $e$ is quickly disengaged from the quadrants and the brake rod $g$ left free. This release is accomplished by the operator by the very natural act of gripping the latch $f$. In most cases such a release is desired at the very time the brakes are being applied and the operator's hand will be upon the hand-lever $a$ in position for instant manipulation of the latch $f$, if occasion demands. Having once thus released the brakes they may, of course, be subsequently picked up again and applied by proper manipulation of the hand lever $a$ and engagement of the pawl $e$ with the teeth $c^2$.

The same results may be secured in a perfectly natural way when the release mechanism is associated with a foot pedal such as is illustrated at $h$ in Figure 2. In this construction it may be assumed that the supporting lever $h'$ for the foot pedal is connected intermediate its ends with the rear wheel brakes through a brake rod $h^2$ while the brake rod $i$ for the front wheel brakes is engaged with the lower end of a lever carried by a quadrant $k$ mounted loosely on the supporting rock shaft $l$. The foot pedal $h$ is hingedly supported on the lever $h'$ as by a hinge pin $h^3$ and carries at one side of the hinge pin a pawl $h^4$ which normally engages teeth $k'$ on the quadrant $k$. In the normal operating position of the brake pedal $h$ the pawl $h^4$ will be engaged with the teeth $k'$ and when foot pressure is applied on four brakes will go on simultaneously. If at any instant during or after application the operator senses a tendency to skid he may release the front brakes instantly by merely tilting the pedal $h$ about the hinge pin $h^3$ thereby withdrawing the pawl $h^4$ from engagement with the teeth $k'$. This foot action will result as naturally and quickly as the hand action heretofore described.

Changes in details of design and application of the same principle to different types of braking systems may be made without departing from the spirit of the invention.

What we claim is:—

1. In braking systems for vehicles, in combination with a plurality of brakes for the front and rear wheels, separate operating members for the front brakes and for the rear brakes including levers mounted on a common rock shaft, connections for the front and rear brakes with the respective levers at opposite sides of the rock shaft, and pawl and ratchet means to interconnect said levers for simultaneous movement.

2. In braking systems for vehicles in combination with a brake operated rod for the rear brakes and a brake operating rod for the front brakes, separate operating levers to which the respective brake rods are connected a pivot about which said levers move, said connections being at opposite sides of the pivot and releasable means interconnecting said operating levers for simultaneous operation thereof.

This specification signed this 15th day of February A. D. 1924.

HENRY J. WHITE.
WILLIAM B. JUPP.